UNITED STATES PATENT OFFICE.

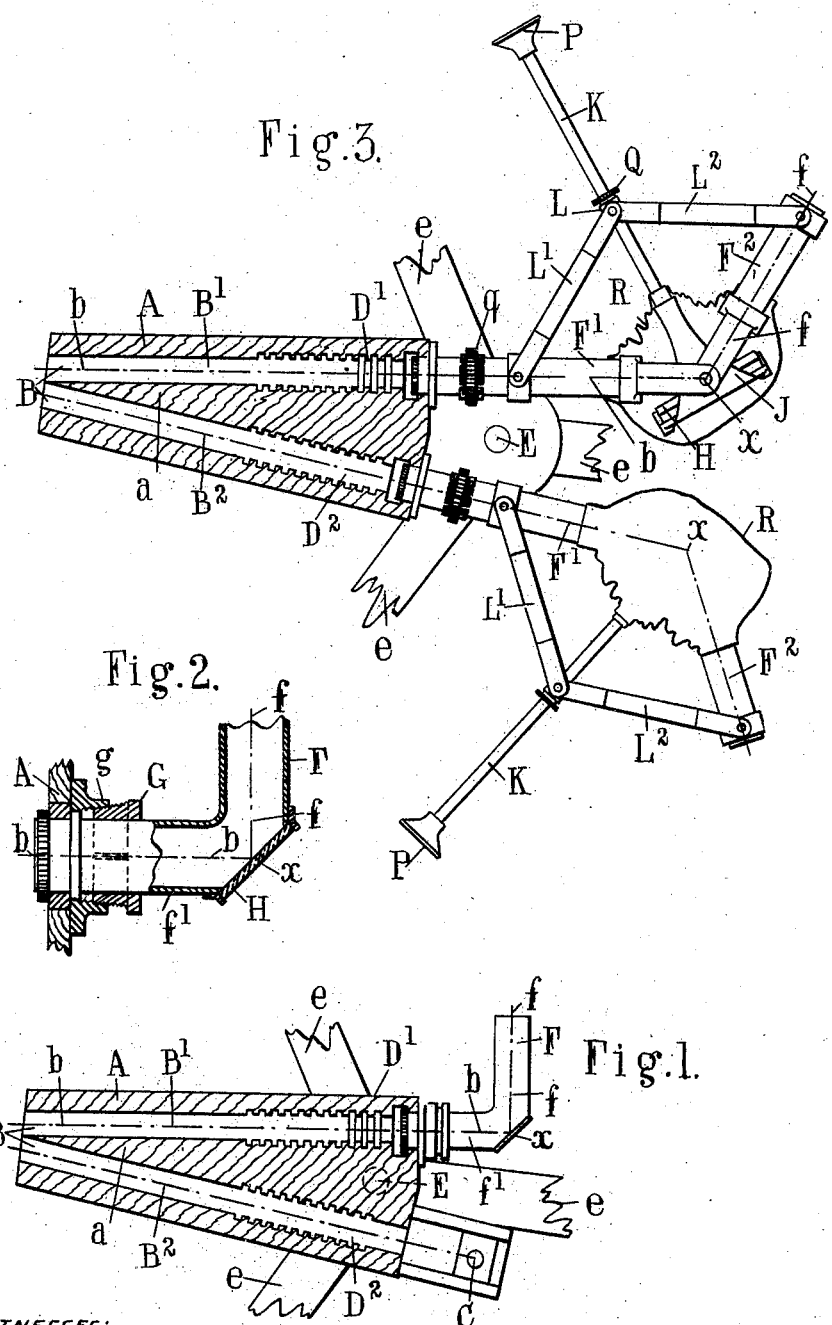

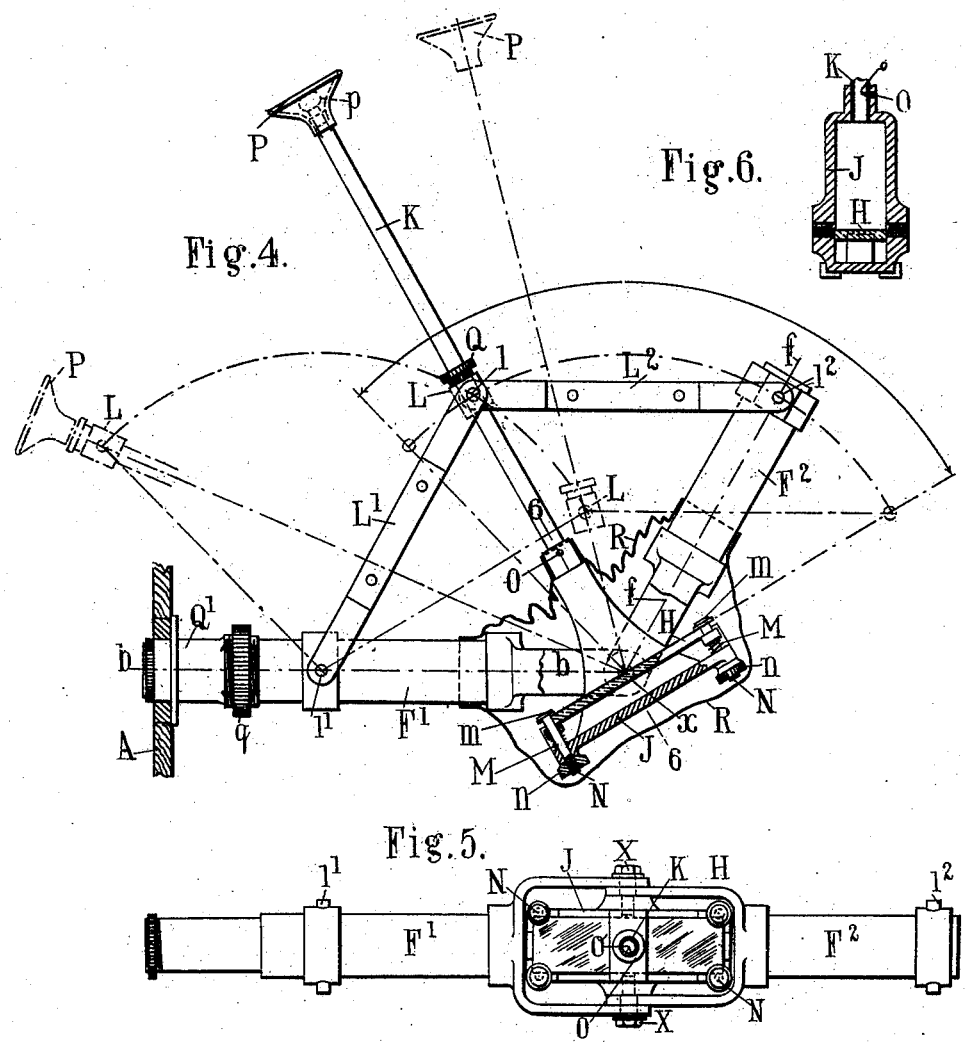

JOSEPH WILLIAMS LOVIBOND, OF SALISBURY, ENGLAND.

APPARATUS FOR COLOR ESTIMATION.

987,148.  Specification of Letters Patent.  Patented Mar. 21, 1911.

Application filed May 2, 1910. Serial No. 558,926.

*To all whom it may concern:*

Be it known that I, JOSEPH WILLIAMS LOVIBOND, a subject of the King of Great Britain, and resident of The Pleasaunce, Lake, Salisbury, in the county of Wilts, England, have invented certain new and useful Improvements in Apparatus for Color Estimation, of which the following is a specification.

This invention relates to improvements in apparatus for use in estimating the intensity of colors, more especially apparatus of the kind which comprises a pair of sighting-tubes whereof the one may contain a sample of the object whose color is to be tested, while the other is adapted to receive a translucent screen or series of screens (exhibiting a standard tint or series of tints) through which a surface of standard luminosity is viewed; the quality and intensity of color in the sample being ascertained by varying the tints composing the screens until the quality and intensity of the colors seen through both tubes are identical.

It sometimes happens that it is required to test the color of an object of which no sample capable of being introduced into the instrument is available and which may therefore require to be observed *in situ*, sometimes while occupying an inaccessible position. Again, it may be desirable to point the instrument in a direction which precludes the use, within the instrument itself, of an artificial light (such as e. g. a standard candle), so that it becomes desirable to fix the standard light externally of the instrument in a position where it is not liable to be affected by the movements of the latter. It has been found moreover, that the instrument possesses very high value when used for the purpose of what may be called a chromo-pyrometer for the estimation of the temperatures of luminous bodies such as the interior of furnaces, it being possible by this means to ascertain and record with great precision temperatures of any height, however great, by the estimation of the color and light-intensity of the incandescent body or surface. But it is evident not only that the interior of all furnaces is quite inaccessible, but that it may be essential for the purpose of conducting a test that the line of vision toward the furnace should follow a direction widely different from that in which the standard light is viewed, inasmuch as this light must obviously be external to the furnace and may require to be mounted independently of the instrument itself.

It is the object of the present improvement to meet requirements such as those mentioned above, and to this end the invention consists in providing means whereby to enable objects external to the instrument to be readily viewed, whatever their position relatively to the observer or whatever the direction in which the latter may require to face or to point the instrument.

According to the present invention either or both of the sighting-tubes of the instrument may be provided with an extension so attached to the body of the instrument as to be capable of angular adjustment either in one direction or (preferably) in any direction within wide limits, a reflector or reflectors being so mounted as to cause rays of light from the object toward which the extension is directed to be projected through the sighting-tube to the eye-piece.

In its simplest form the extension may consist of an elbow tube bent to (preferably) a right angle, the inner limb of the bent tube being fitted to rotate in an aperture in the objective or outer end of the instrument opposite to the eye-piece, and a plane reflector being mounted in the elbow so as to be adapted to receive and transmit to the eye-piece the rays which pass from without through the outer limb of the extension-tube. It is generally preferable, however, to provide one or both of the sighting-tubes of the instrument with an extension-tube connected to the sighting-tube by means of a double or universal joint, means being provided for excluding stray rays of light at the joint when the direction of flexure is changed, and a reflector or reflectors being employed at the joint for the purpose of transmitting to the eye-piece those rays which enter the outer limb of the extension-tube.

In the accompanying drawings, Figure 1 is a plan view partly in section, showing the improved instrument in the simpler form already mentioned, one of the sighting-tubes being provided with an extension which is adjustable in one direction only; while Fig. 2 is a part axial section of the sighting and extension tubes at their point of junction, drawn to a larger scale. Fig. 3 is a plan view, partly in section, showing an instrument each of whose sighting-tubes is provided with an extension which is adjustable in any direction within wide limits. Fig. 4 is a detailed side elevation, partly in section, on the common plane of the axes of the sighting and extension tubes, showing one of the tube-joints of the instrument shown in Fig. 3; while Fig. 5 is a view of the same looking in a direction at right angles to that of Fig. 4, the tubes being extended in mutual alinement and certain parts being removed. Fig. 6 is a part section on line 6—6 of Fig. 4. Figs. 4 to 6 are drawn to a larger scale than Figs. 1 and 3.

Apart from the improvements forming the subject of the present invention, what may be termed the typical form of the instrument, as indicated in Fig. 1, comprises a casing A divided by a longitudinal partition $a$ into a pair of laterally juxtaposed sighting-tubes $B^1$, $B^2$ both of which are commanded from the eye-piece and by a single eye-hole in the form of a transverse slot B provided in the rear wall of the casing, the objective-ends of the respective sighting-tubes having apertures of equal areas. At or beyond the end of one of the tubes ($B^2$ in Fig. 1), which may be distinguished as the standard sighting-tube, is placed the source or medium of illumination constituting the standard. If, as in the example illustrated, artificial light be employed for the purpose this may be constituted by (say) a standard candle C so supported as to be adjustable toward and from the eye-hole B. The illuminant may be such, or so placed, as to be viewed directly or through a white translucent screen or screens, or by reflection from a surface of standard whiteness. Between the standard illuminant or reflecting surface and the eye-hole B, the standard tube $B^2$ is provided with means, as indicated at $D^2$, for the interposition in the line of sight of a variable series of standardized translucent color screens, while similar provision may be made in the other or test sighting-tube $B^1$ for the interposition in the line of sight, as indicated at $D^1$, of such standardized translucent screens as it may be found necessary to employ for the purpose of (say) reducing the luminosity of the object under observation.

The body A of the instrument may for convenience be mounted to turn as at E about a vertical axis carried by a tripod stand whereof the legs are indicated at $e$.

In the improved form of the invention illustrated in Figs. 1 and 2, the test sighting-tube $B^1$, through which the externally-situated object under observation is viewed, is provided with an angularly adjustable extension constituted by a tube F extending at an angle, preferably a right angle as indicated, to the axis $b$—$b$ of the tube $B^1$; the inner portion of the extension-tube F being bent elbow-wise so that the inner limb $f^1$ thus formed extends in axial alinement with the tube $B^1$ itself. The limb $f^1$ is so jointed to the tube $B^1$ as to be rotatable about the common axis $b$—$b$ of both, with the result that the tube F may be turned about said axis so as to command all objects lying within the plane of rotation of its own axis $f$—$f$. To enable the angular adjustment thus effected to be maintained, the limb $f^1$ of the extension-tube may enter the tube $B^1$ through a gland G (Fig. 2) which screws into a socket $g$ on the casing A and is tapered and split so as to contract and grip the limb $f^1$ when the extension F has been turned so as to command the object which it is desired to observe.

At the elbow, or point $x$ of intersection of the axes $b$—$b$ and $f$—$f$, is fixedly mounted a plane reflector H whose surface lying in a plane perpendicular to the common plane of said axes, makes equal angles with both, so that rays from the object under observation, passing through the extension-tube F and falling upon the reflector H, will always be transmitted through the tube $B^1$ to the eye-hole B.

The reflector H is preferably made removable for the purpose of enabling it to be cleaned or repaired when necessary, and may if desired be provided with means for permitting adjustment of its position after replacement.

It will be seen that by means of the combined angular adjustment of the extension-tube F about the axis $b$—$b$, and of the casing A about the vertical axis E of the tripod stand of the instrument, the line of sight through the tubes $B^1$ and F may be made to command any object, whatever its position, assuming that no obstacle to the view is interposed in the path of the visual ray.

In the improved form of the instrument illustrated in Figs. 3 to 6, each of the sighting-tubes $B^1$ and $B^2$ is provided with an angularly adjustable extension constituted by a pair of tubes $F^1$, $F^2$, whereof the inner tube $F^1$ is mounted in axial alinement with the corresponding sighting-tube (say $B^1$) and is jointed to the casing A so as to be rotatable about the common axis $b$—$b$ of $B^1$ and $F^1$, while the outer tube $F^2$ is hinged to the tube $F^1$ so as to be adjustable, in the same plane therewith, through a wide angle with reference to the tube $F^1$ (in the example illustrated about 127½ degrees); with the result that, by moving the tube $F^2$ angularly with reference to the tube $F^1$ while the latter is turned about the axis $b$—$b$, the line of sight represented by the axis $f$—$f$ of the tube $F^2$ may be directed so as to command any object within the range of such compound movement.

At the point $x$ of intersection of the axes $b$—$b$ and $f$—$f$ is mounted a plane reflector H whose surface is automatically caused to so adjust itself as, while remaining in a plane perpendicular to the common plane of said axes, to maintain equal angles with both axes whatever their angular position relatively to one another, so that rays from the object under observation, passing through the extension tube $F^2$ and falling upon the reflector H, will always be transmitted through the tube $B^1$ to the eye-hole B. For this purpose, in the example illustrated, the reflector H is fixedly mounted in a carrier J to which both the tubes $F^1$ and $F^2$ are pivotally attached by means of a pair of trunnions X, X, whose common axis, which lies in the plane of the surface of the reflector H, also extends perpendicular to the common plane of the axes $b$—$b$ and $f$—$f$, intersecting said plane at the point $x$. To insure maintenance of equal angles between the surface of the reflector and the axes $b$—$b$ and $f$—$f$ respectively, the carrier J is provided with a rod K whose axis intersects the surface of the reflector H perpendicularly at the point $x$; this rod being itself caused to constantly bisect the angle between the axes $b$—$b$ and $f$—$f$, by means of a pair of links $L^1$ $L^2$ of equal length which are pivotally attached on the one hand to the tubes $F^1$ $F^2$ at points $l^1$, $l^2$ equidistant from the point $x$, and on the other hand to one another at a common axis represented by a pair of trunnions $l$ provided on a collar L fitted to slide upon the rod K, whose axis is intersected by that of the trunnions $l$.

The reflector H may be adjustably fixed in the carrier J, for which purpose, in the example illustrated, the reflector is made rectangular and supported at its corners by four springs M which concurrently press it in the direction of the axis of the rod K, the tendency of the reflector to move in said direction being restrained by four adjustable screw-bolts N which pass through the carrier J and springs M so that by tightening the nuts $n$ of the bolts, the heads $m$ of the latter will draw down the respective corners of the reflector in opposition to the springs M.

Accurate adjustment of the reflector H is obviously of great importance, and to enable it to be readily ascertained at any moment, the rod K may, as in the example illustrated, be made tubular and provided toward the inner end of its axis with an index-point whose image reflected from the surface of the reflector H, should coincide with the index-point itself when both are viewed from the outer end of the tube K. In Figs. 5 and 6, the index-point is shown as constituted by the sharpened extremity $o$ of a small setscrew O passed through the side of the tube K as far as the axis of the latter, while the outer end of said tube is provided with an eye-piece P which is furnished with a removable plug $p$ for preventing access of light to the reflector H when the adjustment described is not being made.

For the purpose of enabling the angular adjustment of the tube $F^2$ relatively to the tube $F^1$ to be maintained, the collar L may be internally threaded to receive a tapered and split bush Q, also threaded, so that by screwing this bush into the collar L, the latter will be clamped upon the rod (or tube) K. The angular adjustment of the tube $F^1$ in its bearing in the tube $B^1$ may be maintained by means substantially similar to those already described with reference to the corresponding adjustment in Fig. 1, or, as indicated in Fig. 4, by means of a ring $q$ which screws over a split and externally tapered tube $Q^1$ which is fixed to the casing A and constitutes a bearing through which the tube $F^1$ passes and wherein it is capable of being rotated.

It will be seen that by the use of angularly adjustable extension-tubes as last described for both sighting-tubes $B^1$ and $B^2$, the instrument as a whole is rendered independent of the nature and position both of the standard illuminant and also of the object under observation, either or both of which may even be situated toward the rear of the observer; while in the case of the arrangement illustrated, any adjustment not obtainable by conjoint angular movement of the two extension-tubes $F^2$ may be obtained by concurrent rotation of the casing A about the vertical axis E.

R is a bag of fabric impervious to light (such as black velvet with the pile turned inward), which incloses the reflector H and the adjacent ends of the tubes $F^1$, $F^2$ and K so as to exclude all stray rays from the reflector while observations are being made.

The interior of the parts traversed by the rays from the object viewed would be blackened as usual and fitted with stops adapted to intercept all except the sensibly parallel rays.

It is preferable to arrange the extension of any sighting-tube which is adapted to receive the translucent screens, beyond or outside the latter, so that the adjustment of the extension-tube will not tend to disturb the screens or interfere with their manipulation.

Inasmuch as every reflecting medium absorbs a portion of the light which falls upon it and may also color the light transmitted by the reflector, it is necessary, in order that the light transmitted by the improved instrument may be compared with existing standards, that the absorption and color-modification due to each reflector employed should be ascertained and standardized. Moreover, whereas on the one hand, in the case of the fixed reflector employed in the form of apparatus illustrated in Fig. 1, a glass mirror may be employed, for the reason that (the angles of incidence upon and reflection from this mirror never varying) the degree of absorption and color-modification due to the reflector is not liable to alteration, on the other hand in the case of the movable reflector employed in the form of apparatus illustrated in Fig. 3, the mirror should be of speculum (or other) metal in order that the changes in the angles of incidence and reflection may not result in alterations in the degree of absorption and color-modifications.

Claims.

1. In apparatus for color estimation provided with a pair of sight tubes, in combination; an extension tube at the end of and set at an angle to a sight tube and reflecting means at the junction of said tubes, substantially as and for the purpose described.

2. In apparatus for color estimation provided with a pair of sight tubes, in combination, an extension tube at the end of and set at an angle to a sight tube and a reflector at the junction of said tubes said reflector making equal angles with each of said tubes and being perpendicular to the plane of said tubes, substantially as and for the purpose described.

3. In apparatus for color estimation provided with a pair of sight tubes, in combination; an extension tube at the end of and set at an angle to a sight tube, means for rotating said extension tube about the axis of the sight tube, and a reflector at the junction of said tubes for turning light received through the extension tube down the sight tube, substantially as and for the purpose described.

4. In apparatus for color estimation provided with a pair of sight tubes, in combination; an angularly adjustable extension tube at the end of a sight tube, a reflector at the junction of said tubes for turning light received through the extension tube down the sight tube, and means for adjusting the reflector as the extension tube is adjusted so as to maintain said reflector in reflecting position with reference to said tubes, substantially as and for the purpose described.

5. In apparatus for color estimation provided with a pair of sight tubes, in combination; an angularly adjustable extension tube at the end of a sight tube, a reflector at the junction of said tubes arranged to turn light received through the extension tube down the sight tube, and means automatically actuated as the angle of the extension tube is changed to maintain said reflector in reflecting position, substantially as and for the purpose described.

6. In apparatus for color estimation provided with a pair of sight tubes, in combination; an extension tube at the end of and set at an angle with said tube, a reflector making equal angles with said tubes at the junction thereof, means for changing the angle between said tubes, and operative means between each of said tubes and the reflector whereby the aforesaid angles between tubes and reflector are maintained equal as the angle between the tubes is changed, substantially as and for the purpose described.

7. In apparatus for color estimation provided with a pair of sight tubes, in combination; an extension tube at the end of a sight tube, a reflector making equal angles with said tubes at the junction thereof, a rod fixed to and perpendicular to the reflector, and a pair of links pivoted together as to one end and slidable upon said rod and having their other ends pivoted one to each of said tubes, substantially as and for the purpose described.

JOSEPH WILLIAMS LOVIBOND.

Witnesses:
HERBERT D. JAMESON,
RIPLEY WILSON.

---

Copies of this patent may be obtained for five cents each, by addressing the "Commissioner of Patents, Washington, D. C."